United States Patent Office 3,291,636
Patented Dec. 13, 1966

3,291,636
METHOD FOR INSULATING ELECTRICAL ELEMENTS WITH POLYESTER PLASTISOLS AND SUCH ELEMENTS
David H. Reighter, Roslyn, and Robert L. Stratton, Folcroft, Pa., assignors to I-T-E Circuit Breaker Company, Philadelphia, Pa., a corporation of Pennsylvania
No Drawing. Filed Nov. 23, 1962, Ser. No. 239,813
8 Claims. (Cl. 117—212)

This invention relates to a novel method and composition for insulating electrical elements with a polyester plastisol, and to the resulting insulated element. More specifically, it relates to such a method and to a composition useful therein which are particularly suitable for insulating metallic conductors by dipping procedures, in a manner which will meet exacting requirements as to the physical and electrical properties of the insulated elements.

In the following specification and the claims appended hereto it will be understood that all parts and percentages are given by weight unless otherwise indicated.

In the preparation of insulated conductors such as bus bars, certain properties are essential. The insulation must be of sufficient integrity to withstand operating voltages, must be tightly adherent to the conductor and must have mechanical and chemical properties such that it will not deteriorate with repeated use under normal or adverse operating conditions. In the case of bus bars used in connection with switchgear equipment under high voltage conditions, it is also necessary that the insulation be flame retardant so that it can readily withstand conditions which may arise in the event of an overload or short-circuit.

It is among the objects of the present invention to provide a method for insulating electrical elements, particularly metallic conductors such as bus bars, which provides a flame retardant insulating coating upon such elements.

An additional object of the invention is to provide such a method which may be readily practiced to coat even intricately shaped elements by relatively economical dip procedures.

Further objects of the invention are to provide an insulating composition particularly useful in the practice of such method, and the resulting insulated electrical element which meets exacting physical and electrical standards.

Other objects and advantages of the present invention will appear hereinafter.

The present invention provides an efficient, economical method of insulating electrical elements, employing an insulating composition which meets the flame retardant specifications established by the National Electrical Manufacturers Association (NEMA). In accordance with the invention an electrical element is insulated by heating the element and thereafter dipping the same in a liquid insulating composition comprising a polyester resin system comprising a mixture of from about 50 to 75 parts of a polyester resin which, on curing, is a rigid resin having an elastic modulus of at least about $4.0 \times 10^5$ p.s.i. and a polyester resin which, on curing, is a flexible resin having an elastic modulus of no more than about $1.0 \times 10^5$ p.s.i. and, per 100 parts of such mixture, from about 15 to 40 parts of antimony trioxide, from about 25 to 60 parts of a polyvinyl halide plastisol and up to about 300 parts of a filler. In accordance with the invention, the thus coated element is thereafter removed from the liquid dip and the coating cured thereon to form the desired insulated element.

Unexpectedly, the use of the particular formulation specified, including a polyester resin system containing specified proportions of rigid and flexible polyester resins, viz., polyesters which polymerize to rigid and flexible solids, respectively, in admixture with a polyvinyl halide plastisol, antimony trioxide and a filler provides a superior flame retardant insulating coating for metallic elements. It is believed that the polyvinyl halide plastisol acts as a carrier for the polyester resin system to permit cure of the latter without excessive run-off prior to cure. Moreover, it is believed the polyvinyl halide plastisol and polyester resins copolymerize and are cross-linked with a resulting improved uniformity and over-all quality of the insulating coating produced.

Whatever the precise reaction mechanism involved, it has been found that the insulating coating thus provided meets NEMA specifications as to the insulating and flame retardant properties thereof, and exhibits high impact strength, hardness, flexural strength, and thermal compatibility with the insulated element. Such insulating composition is particularly desirable for use in insulating bus bars, due to the high dielectric and mechanical strength necessary in the normal operation of such conductors.

The polyester resins useful in the practice of the present invention are the known polycondensation products of polycarboxylic acids with polyhydric alcohols, alone or modified in well known manner by halogenation or by copolymerization with other suitable monomers.

Particularly suitable are the conventional polymerizable unsaturated polyester resins, such as those prepared by reaction of ethylenically unsaturated polycarboxylic acids with polyhydric aliphatic alcohols, which are suitably employed in admixture with compounds containing polymerizable $CH_2=C<$ groups.

In the preparation of such unsaturated polyesters ethylenically unsaturated polycarboxylic acids such as maleic acid, fumaric acid, aconitic acid, itaconic acid and the like may be utilized, alone or in admixture with a minor proportion of a saturated polycarboxylic acid such as phthalic acid, malonic acid, succinic acid, glutaric acid or sebacic acid. It will of course be understood that, where available, the corresponding anhydrides may be employed instead of or in admixture with the acid reactants used in the preparation of the unsaturated polyester resin. The polyhydric alcohol reactants useful for forming the unsaturated polyesters include dihydric alcohols such as ethylene glycol, diethylene glycol, propylene glycol, dipropylene glycol, 1,4-butanediol, 1,3-butanediol, 1,2-butanediol, 1,4-pentanediol, 1,5-pentanediol and 1,6-hexanediol and less preferably, polyhydric alcohols such as glycerol, pentaerythritol, dipentaerythritol, etc.

The polycarboxylic acids and polyhydric alcohols may be reacted, or either or both initially halogenated and then reacted, in substantially stoichiometric proportions, to produce the corresponding unsaturated polyesters and the resulting polyesters admixed with a monomeric material containing a polymerizable $CH_2=C<$ group, e.g., styrene, a side chain alkyl or halo substituted styrene, or an allyl compounds, in the manner described in United States Patent 2,819,247 for example.

As indicated above, the polyester resin system includes a mixture of from about 50 to 75 parts of a "rigid" polyester resin, i.e., a resin which, upon curing, has an elastic modulus of at least about $4.0 \times 10^5$ p.s.i., and correspondingly from about 50 to 25 parts of a "flexible" polyester resin, i.e., one which, upon curing, has an elastic modulus of no more than about $1.0 \times 10^5$ p.s.i. Preferred rigid polyester resins useful in the practice of the present invention are commercially available, for example, under the trade designations "Hetron 32A" (Durez Plastics' chlorinated unsaturated polyester having a flexural elastic modulus on curing of $\omega 4.0 \times 10^5$ p.s.i., an average Brookfield viscosity (77° F.) of 2300 cps., a specific gravity of 1.31 and an Acid Number of 3) or "Paraplex P-49" (Rohm & Haas' mixture of an unsaturated polyester with monomeric styrene having a flexural elastic modulus on curing of $4.5 \times 10^5$ p.s.i., a viscosity (25° C.) of 2120-2650 cps., a specific gravity (25° C.) of 1.094–1.104 and a maximum Acid Number of 25). A preferred flexible polyester resin is commercially available, for example, under the trade designation "Paraplex P–13" (Rohm & Haas' mixture of 50% unsaturated polyester and 50% styrene monomer having a flexural elastic modulus on curing of $6.4 \times 10^3$ p.s.i., a viscosity (25° C.) of 348–483 cps., a specific gravity (25° C.) of 1.02–1.03 and a maximum Acid Number of 5).

It has been found that this particular mixture of polyester resins provides structural rigidity and yet avoids cracking of the cured insulation when subjected to low temperature conditions.

A chain initiating catalyst is preferably included in the polyester resin system in an amount of the order of about 1% to catalyze the resin cure. Any of the well-known organic peroxide catalysts may, for example, be so employed, including the diacyl aromatic peroxides such as benzoyl peroxide, 2,4-dichloro benzoyl peroxide or p-chlorobenzoyl peroxide; diacyl aliphatic peroxides such as lauroyl peroxide, acetyl peroxide, caprylyl peroxide or myristoyl peroxide; dibasic acid peroxides such as succinic acid peroxide; ketone peroxides such as cyclohexanone peroxide or methylethyl ketone peroxide; or aldehyde peroxides such as hydroxy heptyl peroxide.

The polyvinyl halide plastisol, e.g., a polyvinyl chloride plastisol, provides a carrier for the polyester resin system and facilitates coating by relatively simple dipping operations. The plastisol which, as indicated above, is believed to cross link with the polyester reactants, additionally provides the desired holding power for the uncured polyester liquid resins. It is preferred to utilize an amount of from about 25 to 60 parts of the plastisol per 100 parts of the polyester resin mixture. A plastisol of a vinyl chloride homopolymer is most commonly employed as the carrier for the insulating composition. However, plastisols formulated of copolymers of vinyl chloride and vinylidine chloride as well as copolymers of vinyl chloride with copolymerizable esters such as methyl- and ethyl-methacrylate are also contemplated, as are the copolymers of vinyl chloride and a vinyl ester of a lower saturated aliphatic monocarboxylic acid, e.g., vinyl formate or vinyl acetate. The known plasticizers such as the di(2-ethylalkyl) phthalates may additionally be incorporated in the plastisol.

The antimony trioxide is admixed with the polyester plastisol in an amount ranging from about 15 to 40 parts per 100 parts of the polyester mixture. It is believed the antimony trioxide forms a protective shell which retains halogen vapors released from the polyvinyl halide plastisol, upon heating of the insulating coating, and thereby retards flame formation within the time periods specified by the NEMA specifications.

Combined with the above ingredients is a suitable quantity of an inorganic filler such as finely divided silica flour (200 mesh or finer), barytes, aluminum oxide, calcium carbonate, or other known inorganic fillers which are used in resin formulations. The filler may be employed in any desired amount, up to about 300 parts per 100 parts of the polyester resin mixture, such that it does not interfere with the dipping or deaeration qualities of the coating composition. Preferably a small portion, up to about 12 parts per 100 parts of the total filler, of a hydrated filler is utilized; it has been found that use of such a hydrated material improves the flame retardancy of the final cured composition.

In the method for insulating metallic elements such as bus bars in accordance with the present invention, the element initially is cleaned by sand blasting or other suitable mechanical abrasion. The metallic element, which may be of copper, aluminum or other metal or alloy, is then heated to from about 300° to 350° F. and dipped in the liquid resin formulation with a slight oscillatory downward movement, slowly enough to produce a minimum amount of air entrapment. The metallic embedment is then held beneath the surface of the coating composition for sufficient time to produce the desired insulation thickness. Typically, a 45-second dip produces a coating approximately .1-inch thick. The assembly may be reheated and additional thicknesses applied until the total desired thickness is obtained. The curing times and temperature will vary with the catalyst used, but must at some time in the cycle reach and be held at the minimum temperature to secure cure of the plastisol component.

The following example illustrates a preferred embodiment of the insulating method and composition of the present invention; it will be appreciated that the invention is not limited to such example.

An insulating formulation was made up of the following ingredients:

| | Parts by weight |
|---|---|
| Rigid polyester resin (Hetron 32A) | 43 |
| Flexible polyester resin (Paraplex P–13) | 21 |
| $Sb_2O_3$ | 12 |
| Filler: | |
| $Al_2O_3$ | 48 |
| $Al_2O_3 \cdot 3H_2O$ | 8 |
| Polyvinyl chloride plastisol | 26.5 |
| (Metal & Thermit 4237–5) | |
| Catalyst | |
| Luperco-ATC | 0.64 |
| (Wallace & Tiernan Co. designation for mixture of benzoyl peroxide and tricresyl phosphate) | |

An intricate shaped metal element was cleaned, heated to a temperature of between 300° and 350° F. and dipped in the above formulation. During dipping the metal element was slowly oscillated, and after 55 seconds was removed with the coating .110 inch thick. The coated element was then withdrawn and cured in an oven at a temperature of 350° for 45 minutes to complete the cure of the resin composition.

The resulting insulated element was found to comply with NEMA standards as to flame retardancy.

A further advantage in dip coating electrical conductors is apparent from the following: In the manufacture of bus bars, it has been the practice to silver-plate the surface where good conductivity is desired and where such conductivity might be adversely affected, as through atmospheric oxidation of an uncoated copper surface. Since the silver-plating and associated solutions will not affect the present coating, the silver-plating can be performed after the application of insulation, and silver will adhere only to the uninsulated areas. Thus, there is no need to silver-plate the entire bus bar prior to the application of insulation, as was done in the prior art.

With the present dip coating method, contact areas can easily be masked off prior to dipping. These can then be plated after curing and unmasking, thereby eliminating the necessity and expense of plating the entire bus bar. Alternatively, the entire bar can be dip-coated and the coating cut off, while at maximum cure temperature, in the areas in which no insulation is to be applied. The present invention, therefore, is effectively utilized in encapsulating odd shapes and figures and can eliminate the taping of joints and bends necessary when following prior art methods.

Although this invention has been described with respect to its preferred embodiment, it should be understood that many variations and modifications will be obvious to those skilled in the art, such as its application to the insulation of non-current carrying members such as barriers and shields. It is preferred, therefore, that the scope of this invention be limited not by the specific disclosure herein but only by the appended claims.

What is claimed is:

1. A method of insulating an electrical element comprising heating the element, dipping the same in a liquid insulating composition comprising:

(a) a polyester resin system comprising a mixture of from 50 to 75 parts by weight of a rigid polyester resin having, when cured, an elastic modulus of at least $4.0 \times 10^5$ p.s.i. and from 50 to 25 parts by weight of a flexible polyester resin having, when cured, an elastic modulus of no more than $1.0 \times 10^5$ p.s.i. and, per 100 parts by weight of the ployester resin mixture, (b) from 15 to 40 parts by weight of antimony trioxide, (c) from 25 to 60 parts by weight of a polyvinyl halide plastisol and, (d) up to 300 parts by weight of a filler, removing the coated element from the liquid dip and curing the coating formed thereon to form a flame retardant insulating layer on a portion of the electrical element.

2. The method as defined in claim 1, including silver plating said element, subsequent to curing the insulating coating thereon, in the areas not coated with said coating.

3. The method as defined in claim 1, in which the electrical element is heated to a temperature between 300° and 350° F. prior to dipping in said composition.

4. The method as defined in claim 1, in which the electrical element is a metallic conductor and in which the surface of said conductor is mechanically abraded prior to dipping in said insulating composition.

5. The method as defined in claim 1, in which said composition includes about one part of an organic peroxide chain initiating catalyst per 100 parts of the polyester resin mixture.

6. The method as defined in claim 1, wherein said rigid polyester resin and said flexible polyester resin each consist essentially of reaction products of at least one ethylenically unsaturated polycarboxylic acid, at least one polyhydric aliphatic alcohol, and a compound incorporating a polymerizable vinylidene group.

7. An electrically conductive bus bar having coated on a portion thereon a flame retardant polyester resin insulating coating comprising:

(a) a polyester resin system comprising a mixture of a mixture of from 50 to 75 parts by weight of a rigid polyester resin consisting essentially of the reaction product of at least one ethylenically unsaturated polycarboxylic acid, at least one polyhydric aliphatic alcohol, and a compound incorporating a polymerizable vinylidene group, said rigid polyester resin having, when cured, an elastic modulus of at least $4.0 \times 10^5$ p.s.i.; and from 50 to 25 parts by weight of a flexible polyester consisting essentially of the reaction product of at least one ethylenically unsaturated polycarboxylic acid, at least one polyhydric aliphatic alcohol, and a compound incorporating a polymerizable vinylidene group, said flexible polyester resin having, when cured, an elastic modulus of no more than $1.0 \times 10^5$ p.s.i. and, per 100 parts by weight of the polyester resin mixture;

(b) from 15 to 40 parts by weight of antimony trioxide;

(c) from 25 to 60 parts by weight of a polyvinyl halide; and (d) up to 300 parts by weight of a filler.

8. The insulated electrically conductive bus bar as defined in claim 7, having a coating of silver in the non-insulated areas thereof.

References Cited by the Examiner

UNITED STATES PATENTS

| | | | |
|---|---|---|---|
| 3,078,249 | 2/1963 | Russell | 260—860 X |
| 3,086,888 | 4/1963 | Stratton et al. | 117—212 |
| 3,227,665 | 1/1966 | Fourcade et al. | 260—862 X |

FOREIGN PATENTS 866,384  4/1961  Great Britain.

RALPH S. KENDALL, *Primary Examiner.*

WILLIAM L. JARVIS, *Examiner.*